United States Patent
Macphail-Fausey et al.

(10) Patent No.: US 9,440,516 B2
(45) Date of Patent: Sep. 13, 2016

(54) LATCHING MECHANISM FOR TRANSIT WINDOW ASSEMBLY FOR VEHICLES

(75) Inventors: Bryan Daniel Macphail-Fausey, Fenton, MI (US); Rayburn Alton Wisdom, II, Lawrenceburg, TN (US)

(73) Assignee: Dura Operating, LLC, Auburn Hills, MI (US)

(*) Notice: Subject to any disclaimer, the term of this patent is extended or adjusted under 35 U.S.C. 154(b) by 0 days.

(21) Appl. No.: 13/480,540

(22) Filed: May 25, 2012

(65) Prior Publication Data
US 2013/0312334 A1 Nov. 28, 2013

(51) Int. Cl.
| | |
|---|---|
| *B60J 1/16* | (2006.01) |
| *E05B 53/00* | (2006.01) |
| *E05C 9/00* | (2006.01) |
| *E05C 9/02* | (2006.01) |
| *E05C 9/18* | (2006.01) |
| *E05C 9/22* | (2006.01) |

(52) U.S. Cl.
CPC ............... *B60J 1/16* (2013.01); *E05B 53/003* (2013.01); *E05C 9/002* (2013.01); *E05C 9/02* (2013.01); *E05C 9/1858* (2013.01); *E05C 9/22* (2013.01)

(58) Field of Classification Search
CPC ............ B60J 1/16; E05C 9/22; E05C 9/02; E05C 9/1858; E05C 9/002; E05B 53/003
USPC .................. 49/141, 394, 395, 463, 57, 251; 296/146.15, 146.16; 292/4, 32, 292/DIG. 20, 42
See application file for complete search history.

(56) References Cited

U.S. PATENT DOCUMENTS

| | | | | |
|---|---|---|---|---|
| 2,033,806 A | * | 3/1936 | Baker ................... | E05B 65/025 |
| | | | | 292/164 |
| 3,722,236 A | * | 3/1973 | Zelenko ............... | B65F 1/1426 |
| | | | | 292/161 |
| 3,913,265 A | * | 10/1975 | Ehret et al. ....................... | 49/141 |
| 3,927,492 A | * | 12/1975 | Carson ............................ | 49/141 |
| 4,313,280 A | * | 2/1982 | Ehret et al. ..................... | 49/141 |
| 5,370,428 A | * | 12/1994 | Dreifert et al. ............... | 292/161 |
| 5,619,821 A | * | 4/1997 | St. George et al. ............. | 49/57 |
| 5,725,260 A | * | 3/1998 | Eikmeier et al. ............. | 292/129 |
| 5,941,022 A | * | 8/1999 | Schmuck ....................... | 49/141 |
| 6,340,202 B1 | * | 1/2002 | Stanton et al. ............... | 296/201 |
| 6,688,659 B2 | | 2/2004 | Kobrehel | |
| 7,370,890 B2 | * | 5/2008 | Samsel ................. | E05B 53/001 |
| | | | | 292/162 |
| 7,730,668 B2 | * | 6/2010 | Dankert et al. .................. | 49/141 |
| 2006/0175866 A1 | * | 8/2006 | Dankert et al. ............ | 296/146.16 |

* cited by examiner

*Primary Examiner* — Gregory Strimbu
(74) *Attorney, Agent, or Firm* — Dinsmore & Shohl LLP

(57) ABSTRACT

A transit window assembly for a vehicle includes a panel. A support frame is attached to the panel. An egress frame is removably attached to the support frame. A mounting frame is attached to the vehicle. The egress frame is linked to the mounting frame. A release actuator is attached to the egress frame. A latching mechanism is coupled to the release actuator latching and unlatching the panel relative to the mounting frame preventing and allowing movement of the panel relative to the mounting frame between open and closed positions. The latching mechanism is attached to the egress frame and mounting frame and retains the panel in two directions.

23 Claims, 8 Drawing Sheets

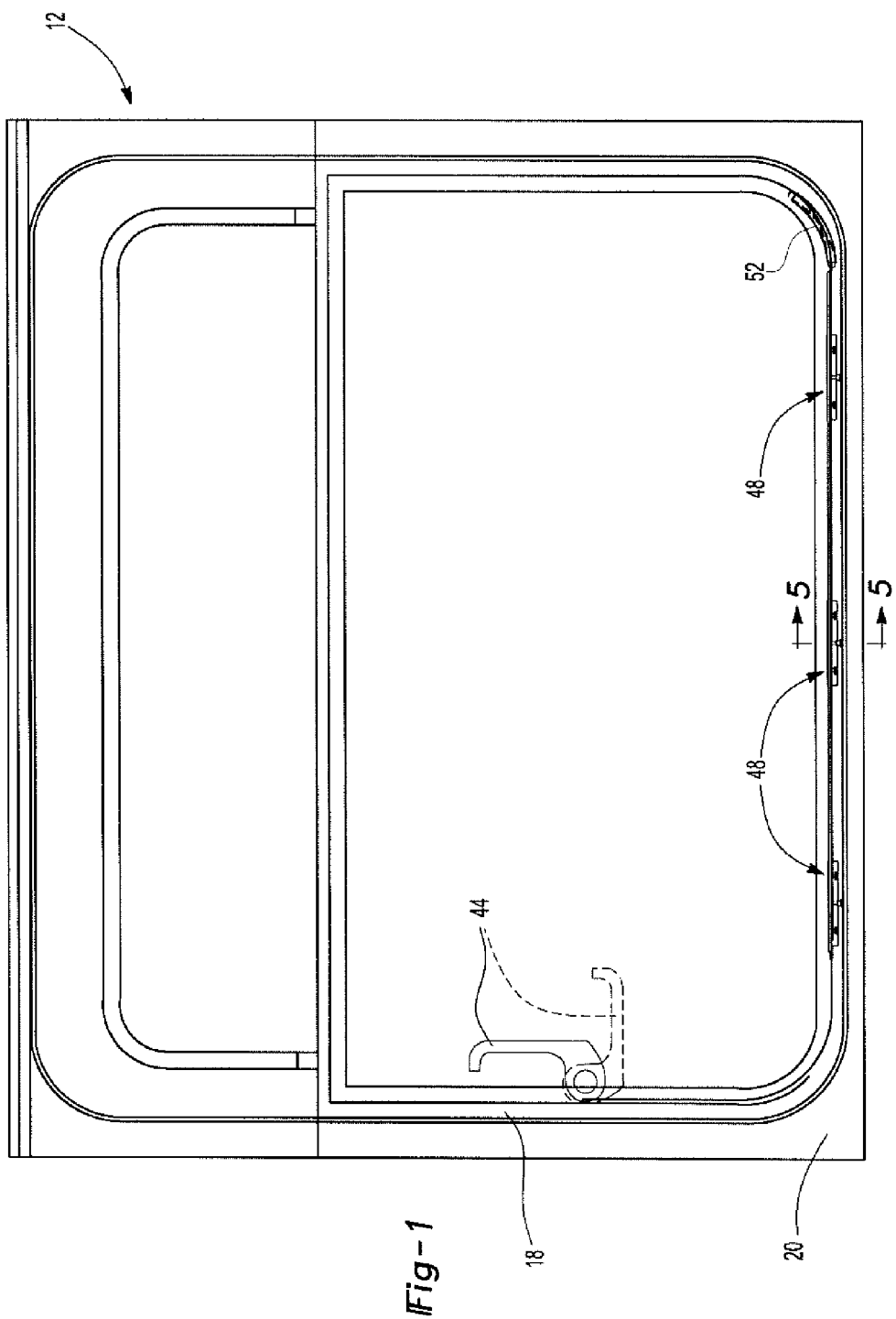

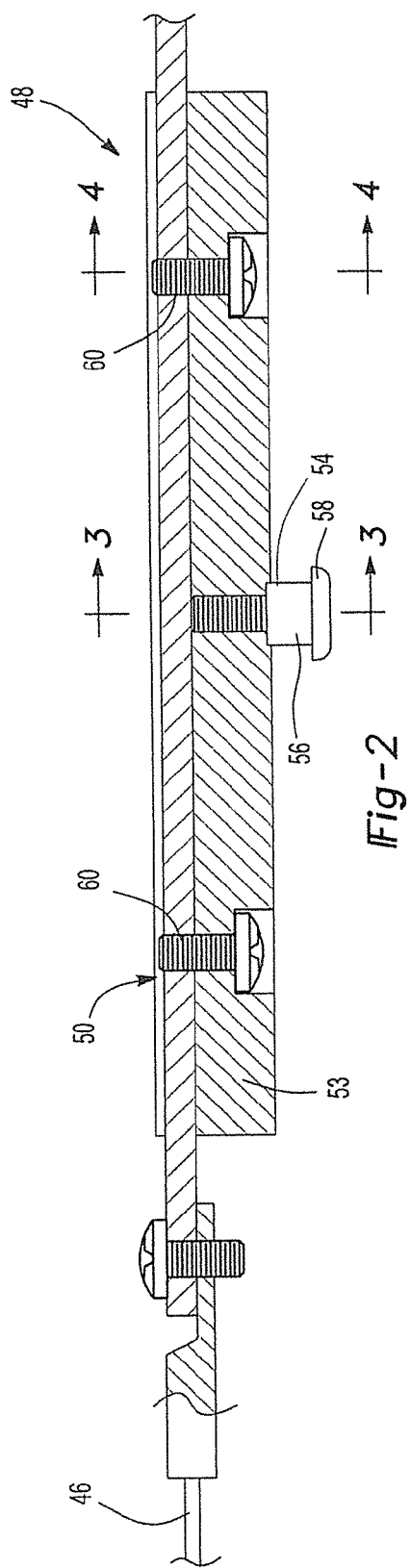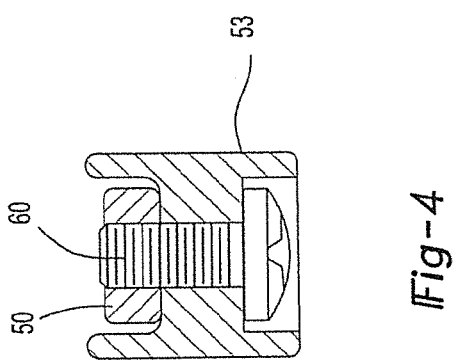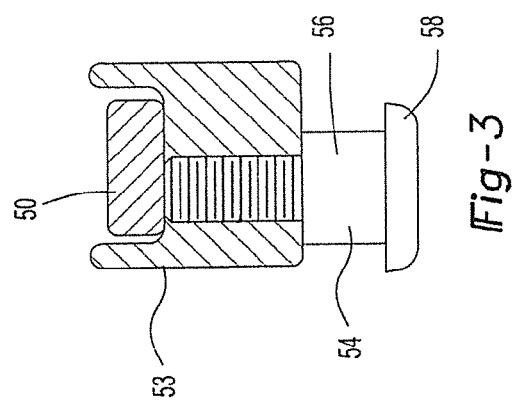

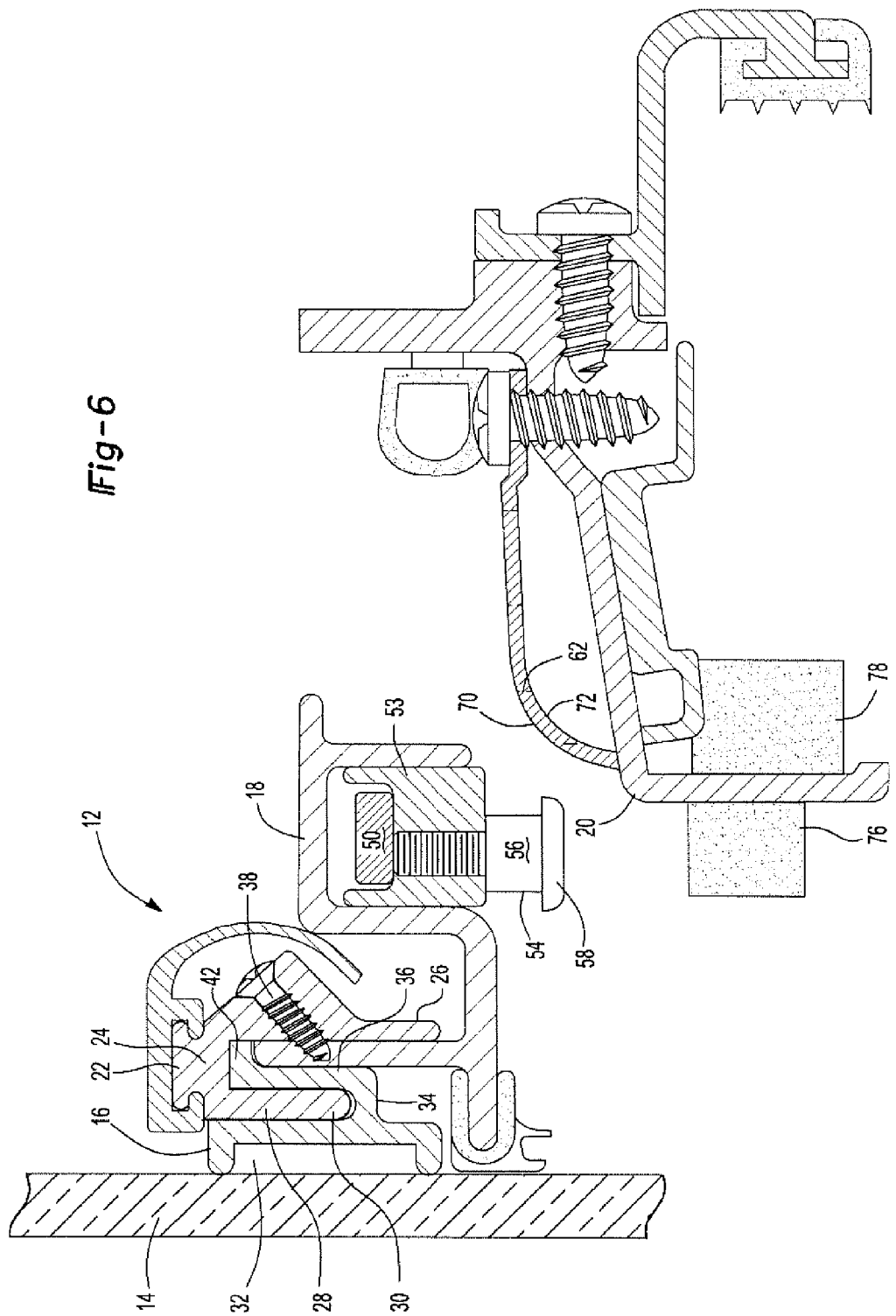

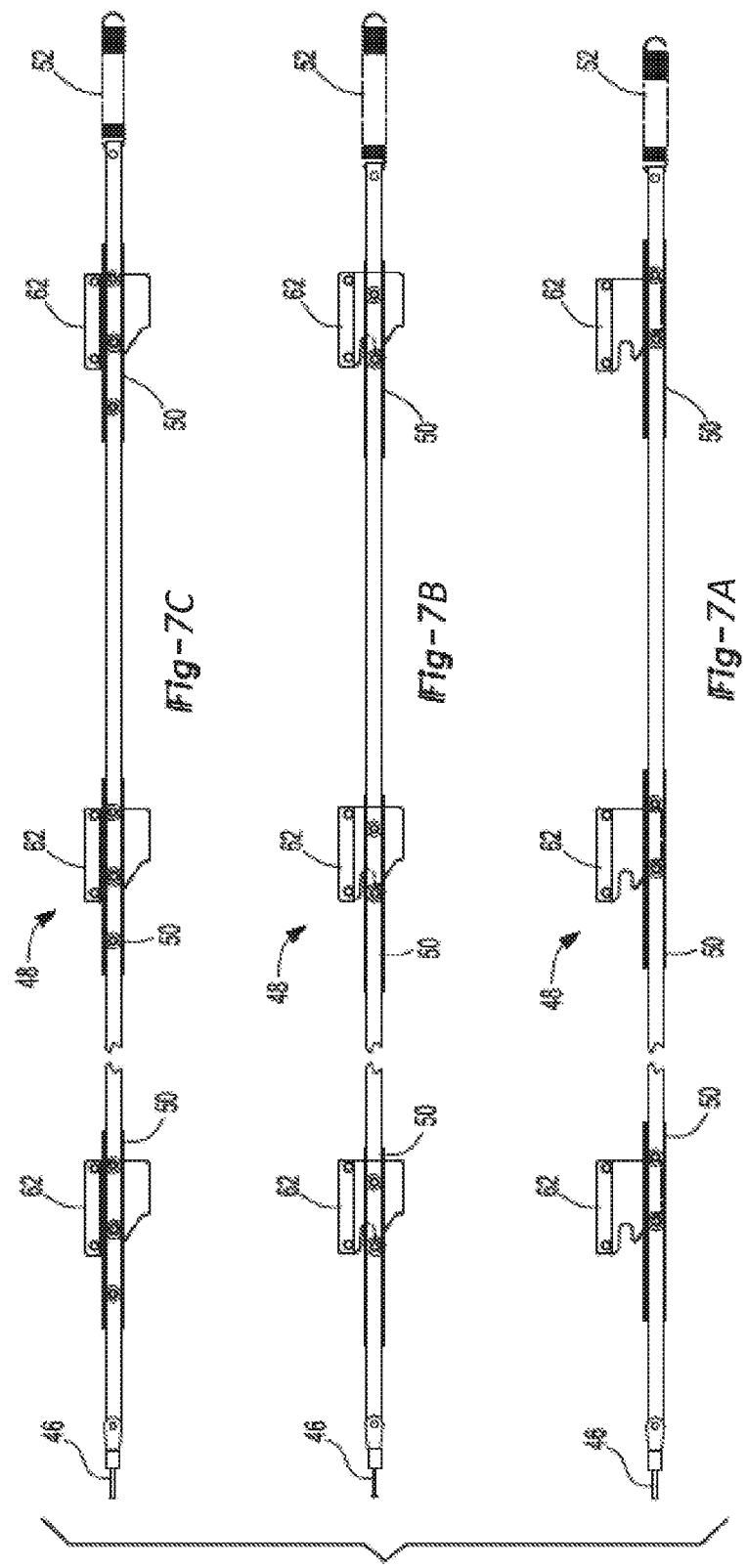

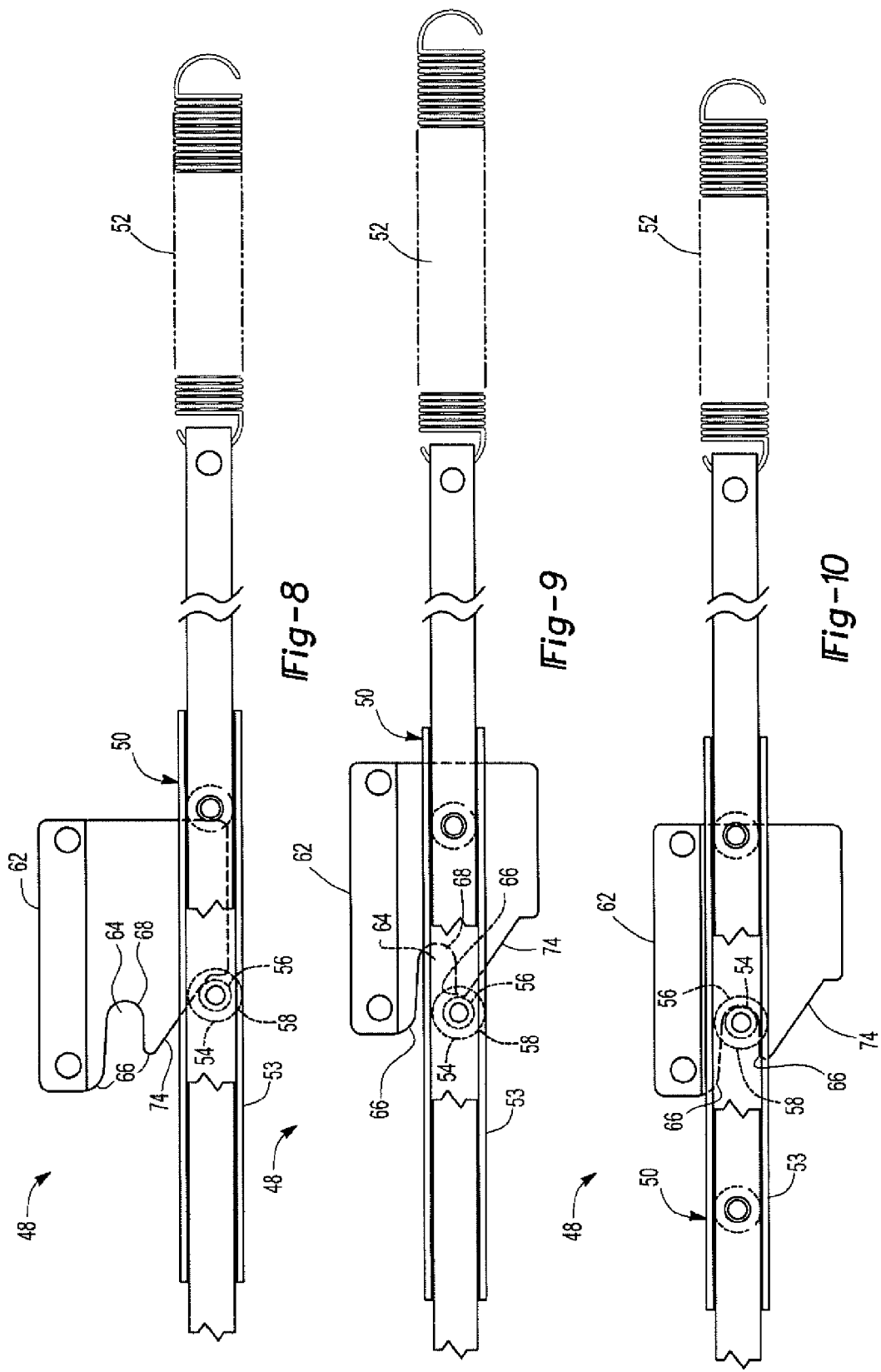

LATCHING MECHANISM FOR TRANSIT WINDOW ASSEMBLY FOR VEHICLES

FIELD OF THE INVENTION

The invention relates to improvements in latching mechanisms for passenger vehicle transit window assemblies.

BACKGROUND OF THE INVENTION

Transit window assemblies may be used on various vehicles including buses, trains, recreational vehicles, as well as other vehicles. Transit windows are utilized in harsh use environments such as public transportation and other environments where the windows are exposed to environmental as well as physical abuse from passengers. Such transit windows require an efficient latching mechanism that securely retains the window and is easily opened and closed and does not cause damage to the latching mechanism. There is therefore a need in the art for a transit window that is easily latched and unlatched without repeated stress placed on the latching mechanism. There is also a need in the art for a transit window that retains the window securely and requires lower efforts by a user to close the window. There is also a need in the art for a transit window that includes components that may be easily coupled together and separated to allow for servicing of various components within the window assembly.

SUMMARY OF THE INVENTION

In one aspect, there is disclosed a transit window assembly for a vehicle that includes a panel. A support frame is attached to the panel. An egress frame is removably attached to the support frame. A mounting frame is attached to the vehicle. The egress frame is linked to the mounting frame. A release actuator is attached to the egress frame. A latching mechanism is coupled to the release actuator latching and unlatching the panel relative to the mounting frame for movement of the panel relative to the mounting frame between open and closed positions. The latching mechanism is attached to the egress frame and mounting frame and retains the panel in two directions.

In another aspect, there is disclosed a transit window assembly for a vehicle that includes a panel. An egress frame is coupled to the panel. A mounting frame is attached to the vehicle. The egress frame is linked to the mounting frame. A latching mechanism between the egress frame and the mounting frame latching and unlatching the panel relative to the mounting frame for movement of the panel relative to the mounting frame between open and closed positions. The latching mechanism retains the panel in two directions.

In a further aspect there is disclosed a transit window assembly for a vehicle that includes a panel. An egress frame is coupled to the panel. A mounting frame is attached to the vehicle. The egress frame is linked to the mounting frame. A latching mechanism between the egress frame and the mounting frame latching and unlatching the panel relative to the mounting frame for movement of the panel relative to the mounting frame between open and closed positions. The latching mechanism includes a release bolt linkage disposed within the egress frame and two or more shoulder bolts attached to the release bolt linkage. The latching mechanism includes two or more retainers attached to the mounting frame with the retainer including a slot formed therein for receiving the shoulder bolt. The head of the shoulder bolt is retained on a lower surface of the retainer wherein the panel is retained in two directions.

In another aspect, there is disclosed a transit window assembly for a vehicle that includes a panel. An egress frame is coupled to the panel. A latching mechanism between the egress frame and the vehicle latching and unlatching the panel relative to the vehicle for movement of the panel relative to the vehicle between open and closed positions. The latching mechanism retains the panel in two directions.

BRIEF DESCRIPTION OF THE DRAWINGS

FIG. 1 is a front view of a transit window;

FIG. 2 is a partial front view of a release bolt linkage conned to a cable and including the shoulder bolts;

FIG. 3 is a partial sectional view along the line 3-3 of a shoulder bolt connected to the release bolt linkage;

FIG. 4 is a partial sectional view along the line 4-4 of a shoulder bolt connected to the release bolt linkage;

FIG. 6 a partial sectional view along the line 5-5 of FIG. 1 showing the transit window in the open position;

FIGS. 7A-C are partial top views of a release bolt linkage connected to a cable and biasing member and including more than two shoulder bolts and retainers in a closed position (FIG. 7 A), mid travel position (FIG. 7B) and an open position (FIG. 7C);

FIG. 8 is a partial top view of a release bolt linkage connected to biasing member and including a shoulder bolt and retainer in an open position;

FIG. 9 is a partial top view of a release bolt linkage connected to biasing member and including a shoulder bolt and retainer in a mid travel position;

FIG. 10 is a partial top view of a release bolt linkage connected to biasing member and including a shoulder bolt and retainer in a closed position;

DETAILED DESCRIPTION OF THE PREFERRED EMBODIMENTS

Figure 5:
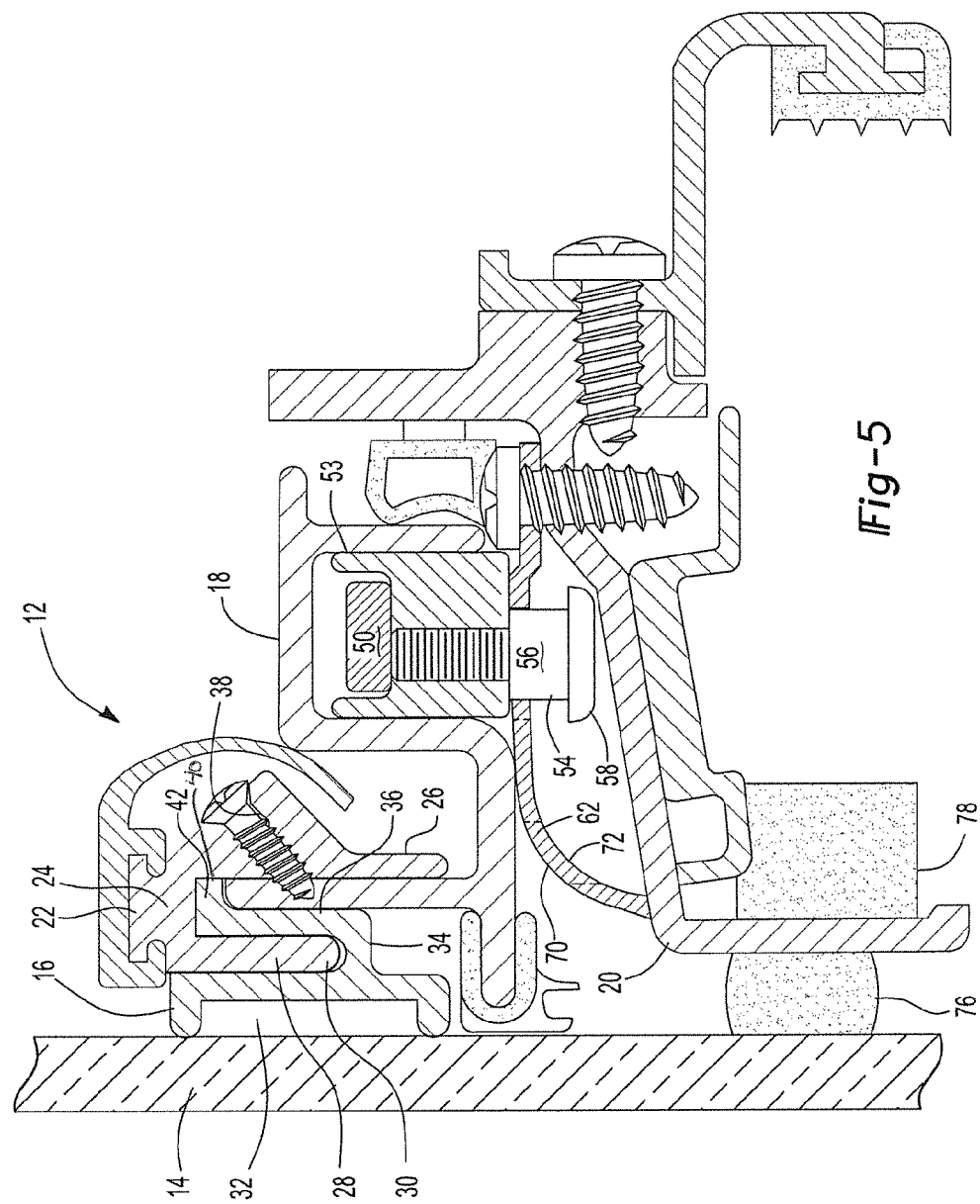
FIG. 5 a partial sectional view along the line 5-5 of FIG. 1 showing the transit window in the closed position.

Referring to the various figures, there is shown a transit window assembly 12 for a vehicle 13. The transit window assembly 12 includes a panel 14. The panel 14 may include various structures such as a glass sheet, plastic or other acrylic sheet, or a metal panel or other material. In the depicted embodiment a support frame 16 is attached to the panel 14. An egress frame 18 is removably attached to the support frame 16. A mounting frame 20 is attached to the vehicle. The egress frame 18 is linked to the mounting frame 20.

In one aspect, the panel 14 may be permanently affixed to the egress frame 18 to form a bonded window. Alternatively, the panel 14 may be inserted within the egress frame 18 to form a framed window. Various window structures may be utilized with the depicted embodiment showing one version of a window that may separated easily from an egress frame 18 for servicing.

In one aspect, a rigid linkage 22 removably connects the egress frame 18 to the support frame 16. The rigid linkage 22 includes a u-shaped body 24 having a first leg 26 that is removably attached to the egress frame 18 and a second leg 28 that is received in a slot 30 defined in the support frame 16. As can be seen in FIGS. 5 and 6, the support frame 16 includes a trough section 32 that receives an adhesive attaching the support frame 16 to the panel 14. The support frame 16 also includes a first leg portion 34 that extends from the trough section 32 and a second leg portion 36 that extends at an angle from the first leg portion 34 defining the slot 30. The rigid linkage 22 includes an indentation 38 formed therein that receives a fastener removably attaching the rigid linkage 22 to the egress frame 18. In one aspect, the indentation 38 may be formed at an angle to assist in decoupling the rigid linkage 22 and the egress frame 18. In this manner the fastener may be removed without obstruction by structures within a vehicle such as seats or the like.

In one aspect, the support frame 16 includes a positioning datum 40 aligning a glazing attaching the panel 14 to the support frame 16. In one aspect, the second leg portion 36 includes a third leg portion 42 that extends at an angle from the second leg portion 36. The third leg portion 42 contacts the egress frame 18 and rigid linkage 22. The support frame 16 is connected to the panel 14 and is positioned between the panel 14 and the egress frame 18. The contact of the third leg portion positions the support frame 16 relative to the egress frame. The rigid linkage 22 connects the support frame 16 and the egress frame 18. The contact of the third leg portion and egress frame defines the connection point of the support frame 16 and panel 14 and ensures that proper alignment of the panel 14 is achieved.

Again referring to the figures, the transit window assembly 12 may include a release actuator 44 attached to the egress frame 18. The release actuator 44 may be a release handle, as shown in FIG. 1 or may be any other type of structure. The release actuator 44 may be attached to a release cable 46 or other linking structure that is disposed within the egress frame 18. The release cable 46 is coupled to a latching mechanism 48.

The latching mechanism 48 latches and unlatches the panel 14 relative to the mounting frame 20 for movement of the panel 14 relative to the mounting frame 20 between open and closed positions as shown in FIGS. 6 and 5 respectively. In the depicted embodiment, the latching mechanism 48 is attached to the egress frame 18 and the mounting frame 20 and retains the panel 14 in two directions, as will be discussed in more detail below.

The latching mechanism 48 includes a release bolt linkage 50 as best shown in FIGS. 2 and 7-10. The release bolt linkage 50 is connected to the release cable 46 at one end of the release bolt linkage 50 and is connected to a biasing member 52 at another end of the release bolt linkage 50. The biasing member 52 may be attached to the egress frame 18 at an opposing end of the biasing member 52 relative to the end attached to the release bolt linkage 50. The biasing member 52 applies a force to the release bolt linkage 50 to facilitate latching of the latching mechanism 48, as will be discussed in more detail below. In one aspect, the release bolt linkage 50 may include multiple sections that are joined to define the linkage but may alternatively be one piece. In another aspect, there release bolt linkage 50 may be modified such that the release bolt 53 and shoulder bolt 54 are attached to the release cable 46. In this embodiment, the release bolt 53 may be attached to the extended release cable 46 using an appropriate connection such as a loop, eyelet or other linking structure. As with the above described release bolt linkage 50, a biasing member 52 may be connected to the release cable 46.

At least one release bolt 53 and shoulder bolt 54 is connected to the release bolt linkage 50. In one aspect two or more release bolts 53 and shoulder bolts 54 may be utilized with three being shown in the figures. As shown in FIG. 3 the release bolt 53 may be attached to the release bolt linkage 50 using a threaded fastener 60 or any other type of fastening member. The shoulder bolt 54 may be attached to the release bolt 53 and includes a shank 56 that extends and terminates at a head 58.

The latching mechanism 48 also includes at least one retainer 62 attached to the mounting frame 20. In one aspect two or more retainers 62 may be utilized with three being shown in the figures. The retainer 62 includes a slot 64 formed therein receiving the shank 56 of the shoulder bolt 54 when the panel 14 is in the closed position. The slot 64 includes separated sidewalls 66 connected by a radiused section 68. One of the side walls 66 may be angled toward a centerline of the slot 64 for retaining the shoulder bolt 54 within the slot 64 in the closed position. Positioning of the shank 56 within the slot 64 defines a first direction of retention of the latching mechanism 48. The retainer 62 includes upper and lower surfaces 70, 72 and an angled peripheral edge 74. The shank 56 of the shoulder bolt 54 travels on the angled edge 74 when the panel 14 is moved from the open to the closed position. The head 58 of the shoulder bolt 54 has a diameter greater than the width of the slot 64 and is positioned to contact and be retained on the lower surface 72 of the retainer 62 defining a second direction of retention of the latching mechanism 48. Alternatively, the retainer 62 may be moved by the actuator 44 while the shoulder bolt is attached to the mounting frame 20, reversing the structure as shown in the depicted embodiment.

Again referring to FIGS. 5 and 6, the transit window assembly 12 may include additional seals such as a seal 76 between the mounting frame 20 and the panel 14, as well as another seal 78 between the mounting frame 20 and the egress frame 18. In this manner various components of the transit window assembly 12 remained sealed.

Referring to the figures operation of the transit window assembly 12 is described where the panel 14 may be moved from the closed position to the open position as shown in FIGS. 5 and 6. A user may move the release actuator 44 such that a force is transferred to the cable 46 connected with the release bolt linkage 50. The release bolt linkage 50 moves in response to the handle movement such that the shoulder bolts 54 slide out of the slots 64 formed in the retainers 62. The egress frame 18 is now decoupled from the mounting frame 20 such that the panel 14 may now be moved relative to the mounting frame 20 to an open position.

Movement of the panel 14 from the open position to the closed position will be discussed with reference to FIG. 7-10. As shown in FIG. 8, the shank 56 of the shoulder bolt 54 contacts the angled edge 74 of the retainer 62 with the head 58 of the shoulder bolt 54 positioned on the lower surface 72 of the retainer 62. The shank 56 travels on the angled edge 74 in response to movement of the panel 14 toward the closed position. Contact of the shank 56 with the angled edge 74 applies a force to the biasing member 52 such that the biasing member 52 is stretched storing a tension force in the biasing member 52. As the shank 56 of the shoulder bolt 54 travels along the angled edge 74 it approaches a mid travel position as shown in FIG. 9. The mid travel position occurs as the shank 56 of the shoulder bolt 54 is positioned at the opening of the slot 64 formed in the retainer 62. As the shank 56 passes the mid travel position the stored energy in the biasing member 52 pulls the release bolt linkage 50 and the shoulder bolt 54 into the slot 64 formed in the retainer 62 thereby lessening a load necessary to latch the transit window and improving the durability of the transit window. Current prior art transit windows often require a ramping mechanism that requires a flexing or deformation of components that requires additional force to be applied to the mechanism resulting in extra closing efforts. Such additional loads may result in a shorter service life of such a component. The latching mechanism and transit window assembly of the present invention overcomes these problems as described above.

The shank 56 of the shoulder bolt 54 is positioned within the slot 64 and the head 58 of the shoulder bolt 54 is retained on the lower surface 72 of the retainer 62 preventing upward pull out of the shoulder bolt 54. The shank 56 positioned within the slot 64 of the retainer 62 prevents outward movement of the panel 14 relative to the mounting frame 20 and the head 58 positioned and retained on the lower surface 72 of the retainer 62 prevents upward movement of the panel 14 relative to the mounting frame 20 such that the latching mechanism 48 retains the panel 14 in two directions.

Figure 11:
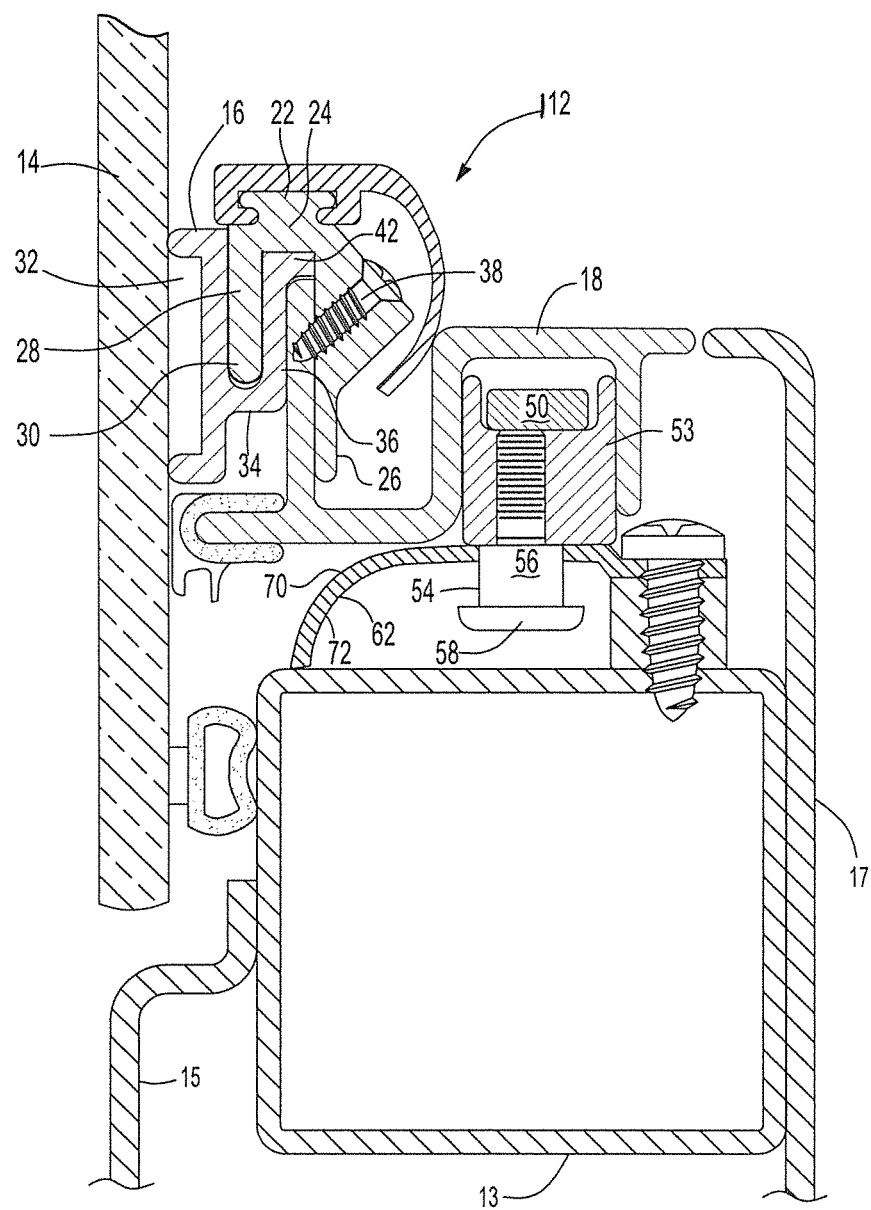
FIG. 11 is a partial sectional view showing the egress frame connected to a vehicle showing the transit window in the closed position.
Figure 12:
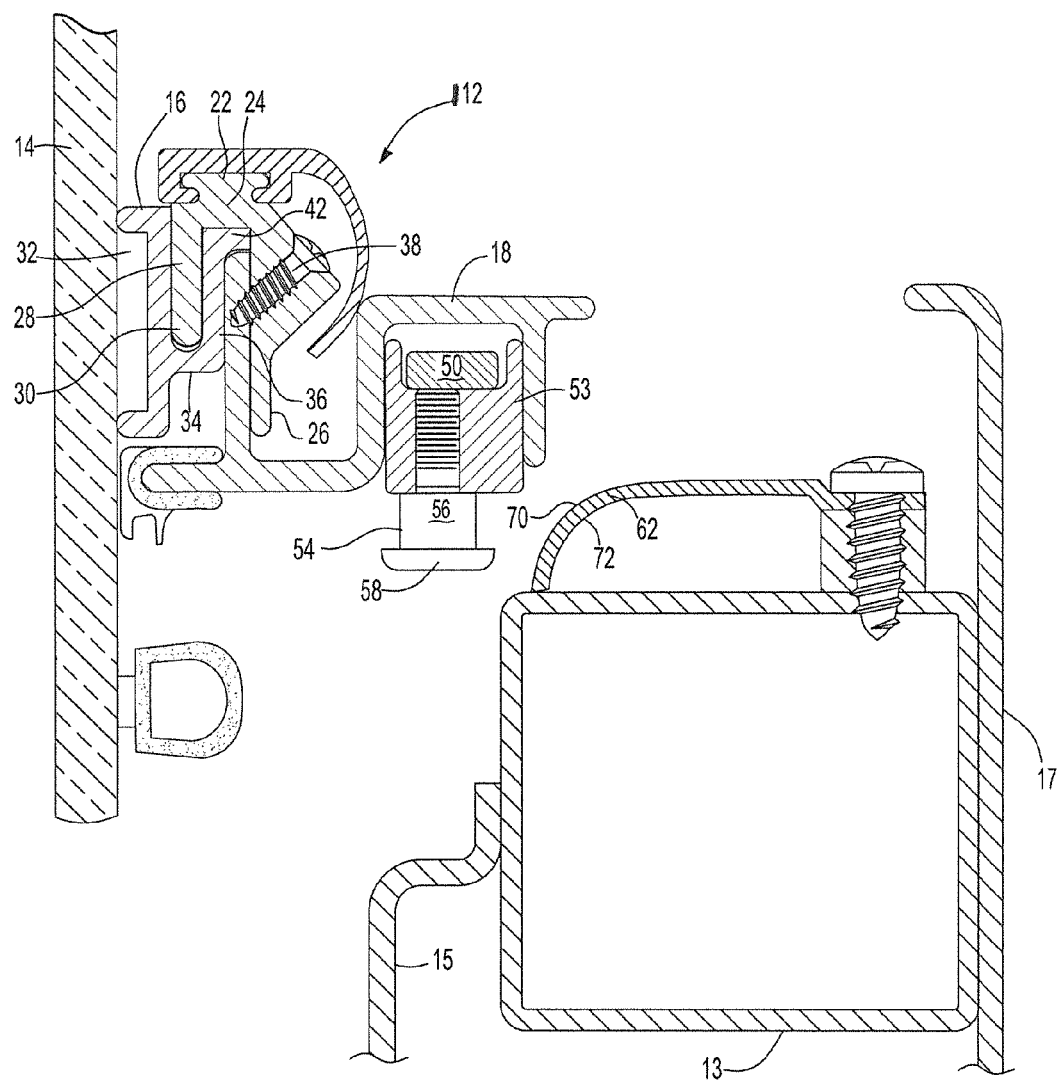
FIG. 12 is a partial sectional view showing the egress frame connected to a vehicle showing the transit window in the open position.

Alternatively as shown in FIGS. 11 and 12, an embodiment of a transit window assembly 112 having the latching mechanism 48 may link the panel 14 directly to a vehicle structure 13, as shown in the depicted embodiment of FIGS. 11 and 12. In this embodiment, the egress frame 18 may be linked directly to a vehicle structure 13 and not to a mounting frame 20 as shown in the previous embodiments. As shown in the figures, the retainer 62 may be attached to the vehicle structure 13. The vehicle structure 13 may include an outer skin 15 and an interior trim 17 to finish the opening. Similar structures as to those described above are numbered the same as in the previous embodiments.

In the depicted embodiment of FIGS. 11 and 12 the panel 14 is connected to a support frame 16 as described above. The support frame 16 is connected to the egress frame 18. The egress frame 18 is linked to the vehicle 13.

Alternatively, as described above, the panel 14 may be attached directly to the egress frame 18 as described above without a support frame 16.

The latching mechanism 48 includes a release bolt linkage 50. The release bolt linkage 50 is connected to the release cable 46 at one end of the release bolt linkage 50 and is connected to a biasing member 52 at another end of the release bolt linkage 50. The biasing member 52 may be attached to the egress frame 18 at an opposing end of the biasing member 52 relative to the end attached to the release bolt linkage 50. The biasing member 52 applies a force to the release bolt linkage 50 to facilitate latching of the latching mechanism 48. In one aspect, the release bolt linkage 50 may include multiple sections that are joined to define the linkage but may alternatively be one piece. In another aspect, there release bolt linkage 50 may be modified such that the release bolt 53 and shoulder bolt 54 are attached to the release cable 46. In this embodiment, the release bolt 53 may be attached to the extended release cable 46 using an appropriate connection such as a loop, eyelet or other linking structure. As with the above described release bolt linkage 50, a biasing member 52 may be connected to the release cable 46.

At least one release bolt 53 and shoulder bolt 54 is connected to the release bolt linkage 50. In one aspect two or more release bolts 53 and shoulder bolts 54 may be utilized. The release bolt 53 may be attached to the release bolt linkage 50 using a threaded fastener 60 or any other type of fastening member. The shoulder bolt 54 may be attached to the release bolt 53 and includes a shank 56 that extends and terminates at a head 58.

The operation of the transit window assembly 112 including latching and unlatching of the transit window assembly 112 is the same as that described above with the previous embodiments. The open and closed positions of the transit window assembly 112 are shown in FIGS. 11 and 12 respectively.

Additionally, the positions of the retainer 62 and shoulder bolt 54 may be switched such that retainer 62 moved by the actuator 44 and the shoulder bolt 54 is attached to the vehicle 13.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A transit window assembly for a transit vehicle comprising:
   a substantially transparent panel;
   a support frame attached to the panel;
   an egress frame removably attached to the support frame;
   a mounting frame configured to attach to the vehicle, the egress frame linked to the mounting frame;
   a release actuator attached to the egress frame;
   a latching mechanism coupled to the release actuator and coupling and decoupling the panel relative to the mounting frame respectively preventing and allowing movement of the panel relative to the mounting frame between open and the closed positions, the latching mechanism attached to the egress frame and mounting frame, the latching mechanism retaining the panel in first and second directions when coupling the panel relative to the mounting frame when the panel is in the closed position, said first direction being a direction of outward movement of the panel relative to the mounting frame and said second direction being upward movement of the panel relative to the mounting frame wherein the latching mechanism includes at least one shoulder bolt and at least one retainer, the at least one retainer including a slot formed therein, the retainer fixed to the mounting frame and at least one shoulder bolt moveable in and the out of the slot, the shoulder bolt including a head having a diameter greater than a width of the slot and wherein the retainer includes a peripheral edge cam surface wherein a shank of the shoulder bolt contacts the peripheral edge cam surface causing the shoulder bolt to slide linearly relative to the egress frame which applies a force to a biasing member coupled to the latching mechanism storing a tension force in the biasing member pulling the shoulder bolt into the slot when the panel is moved relative to the mounting frame from the open position to the closed position.

2. The window assembly of claim 1 wherein the release actuator includes a release handle connected to a release cable disposed within the egress frame, the release cable coupled to the latching mechanism.

3. The window assembly of claim 2 wherein the latching mechanism includes a release bolt linkage disposed within the egress frame, the release bolt linkage connected to the release cable at one end of the release bolt linkage and connected at another end of the release bolt linkage to the biasing member.

4. The window assembly of claim 3 wherein the at least one shoulder bolt is connected to the release bolt linkage.

5. The window assembly of claim 4 wherein the shank of the shoulder bolt terminates at the head.

6. The window assembly of claim 5 wherein the retainer includes upper and lower surfaces.

7. The window assembly of claim 6 wherein the shank of the shoulder bolt is received in the slot when the panel is in the closed position and the latching mechanism is coupling the panel to the mounting frame which prevents the outward movement of the panel relative to the mounting frame.

8. The window assembly of claim 7 wherein the slot includes separated sidewalls connected by a radiused section, one of the sidewalls angled toward a centerline of the slot for retaining the head of the shoulder bolt.

9. The window assembly of claim 6 wherein the head of the shoulder bolt is positioned to contact and be retained by the lower surface of the retainer preventing the upward movement of the panel relative to the mounting frame when the panel is in the closed position and the latching mechanism is coupling the panel to the mounting frame.

10. The window assembly of claim 1 wherein the at least one retainer includes two or more retainers and the at least one shoulder bolt includes two or more shoulder bolts.

11. The window assembly of claim 1 including a rigid linkage connecting the egress frame to the support frame.

12. The window assembly of claim 1 wherein the support frame includes a trough section for receiving an adhesive for attaching the support frame to the panel.

13. A transit window assembly for a transit vehicle comprising:
a substantially transparent panel;
an egress frame coupled to the panel;
a mounting frame attached to the vehicle, the egress frame linked to the mounting frame;
a latching mechanism coupling and decoupling the panel relative to the mounting frame respectively preventing and allowing movement of the panel relative to the mounting frame between open and closed positions, the latching mechanism retaining the panel in first and second directions when coupling the panel relative to the mounting frame when the panel is in the closed position, said first direction being a direction of outward movement of the panel relative to the mounting frame and said second direction being a direction of upward movement of the panel relative to the mounting frame wherein the latching mechanism includes at least one shoulder bolt and at least one retainer, the at least one retainer including a slot formed therein, the retainer fixed to the mounting frame and the at least one shoulder bolt moveable in and out of the slot, the shoulder bolt including a head having a diameter greater than a width of the slot and wherein the retainer includes a peripheral edge cam surface wherein a shank of the shoulder bolt contacts the peripheral edge cam surface causing the shoulder bolt to slide linearly relative to the egress frame which applies a force to a biasing member coupled to the latching mechanism storing a tension force in the biasing member pulling the shoulder bolt into the slot when the panel is moved relative to the mounting frame from the open position to the closed position.

14. The window assembly of claim 13 wherein the latching mechanism includes at least one release bolt linkage disposed within the egress frame and the at least one shoulder bolt connected to the release bolt linkage.

15. The window assembly of claim 14 wherein a head of the shoulder bolt is positioned to contact and be retained by a lower surface of the retainer when the panel is in the closed position and the latching mechanism is coupling the panel to the mounting frame which prevents the upward movement of the panel relative to the mounting frame.

16. The window assembly of claim 14 wherein the shank of the shoulder bolt is retained in the slot when the panel is in the closed position and the latching mechanism is coupling the panel to the mounting frame which prevents the outward movement of the panel relative to the mounting frame.

17. The window assembly of claim 13 wherein the latching mechanism includes an actuator.

18. A transit window assembly for a transit vehicle comprising:
a substantially transparent panel;
an egress frame coupled to the panel;
a latching mechanism attached to the egress frame and the vehicle, the latching mechanism coupling and decoupling the panel relative to the vehicle respectively preventing and allowing movement of the panel relative to the vehicle between open and closed positions, the latching mechanism retaining the panel in first and second directions when coupling the panel relative to the vehicle when the panel is in the closed position, said first direction being a direction of outward movement of the panel relative to the vehicle and said second direction being a direction of upward movement of the panel relative to the vehicle wherein the latching mechanism includes at least one shoulder bolt and at least one retainer, the retainer including a slot formed therein, the retainer fixed to the vehicle and the at least one shoulder bolt moveable in and out of the slot, the shoulder bolt including a head having a diameter greater than a width of the slot and wherein the retainer includes a peripheral edge cam surface wherein a shank of the shoulder bolt contacts the angled peripheral edge cam surface causing the shoulder bolt to slide linearly relative to the egress frame which applies a force to a biasing member coupled to the latching mechanism storing a tension force in the biasing member pulling the shoulder bolt into the slot when the panel is moved relative to the vehicle from the open position to the closed position.

19. The window assembly of claim 18 wherein the latching mechanism includes at least one release bolt linkage disposed within the egress frame and the at least one shoulder bolt connected to the release bolt linkage.

20. The window assembly of claim 19 wherein the shank of the shoulder bolt is retained in the slot when the panel is in the closed position and the latching mechanism is coupling the panel to the vehicle which prevents the outward movement of the panel relative to the vehicle.

21. The window assembly of claim 19 wherein the head of the shoulder bolt is positioned to contact and be retained by a lower surface of the retainer when the panel is in the closed position and the latching mechanism is coupling the panel to the vehicle which prevents the upward movement of the panel relative to the vehicle.

22. The window assembly of claim 18 wherein the latching mechanism includes an actuator and the at least one shoulder bolt is attached to the egress frame.

23. The window assembly of claim 18 wherein the panel is attached to a support frame and the support frame is removably attached to the egress frame.

\* \* \* \* \*